(12) United States Patent  
Jovanovich et al.

(10) Patent No.: US 8,331,792 B2
(45) Date of Patent: Dec. 11, 2012

(54) OUT OF BAND DATA TRANSFER OVER OPTICAL CONNECTIONS

(75) Inventors: Alan Frank Jovanovich, Port Ludlow, WA (US); Jeffrey Douglas Scotten, Granite Bay, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 348 days.

(21) Appl. No.: 12/790,375

(22) Filed: May 28, 2010

(65) Prior Publication Data

US 2011/0293282 A1    Dec. 1, 2011

(51) Int. Cl.
*H04B 10/00*    (2006.01)
(52) U.S. Cl. ............................ 398/140; 398/135; 455/68

(58) Field of Classification Search .......... 398/135–140; 455/68
See application file for complete search history.

(56) References Cited

FOREIGN PATENT DOCUMENTS
KR    2006133163    * 12/2006

* cited by examiner

*Primary Examiner* — Leslie Pascal
(74) *Attorney, Agent, or Firm* — Morrison & Foerster LLP

(57) ABSTRACT

Provided herein are various schemes for transmitting out of band (OOB) signals over optical connections that may not support the transmission of such signals. One scheme may involve converting the OOB signals to different types of signals that are supported by the optical connection, while another scheme may utilize a separate parallel connection that supports the transmission of out of band signals in order to extend the optical connection. Yet another scheme modulates the reference clock of the original (in-band) signal to transmit and receive the OOB information.

25 Claims, 8 Drawing Sheets

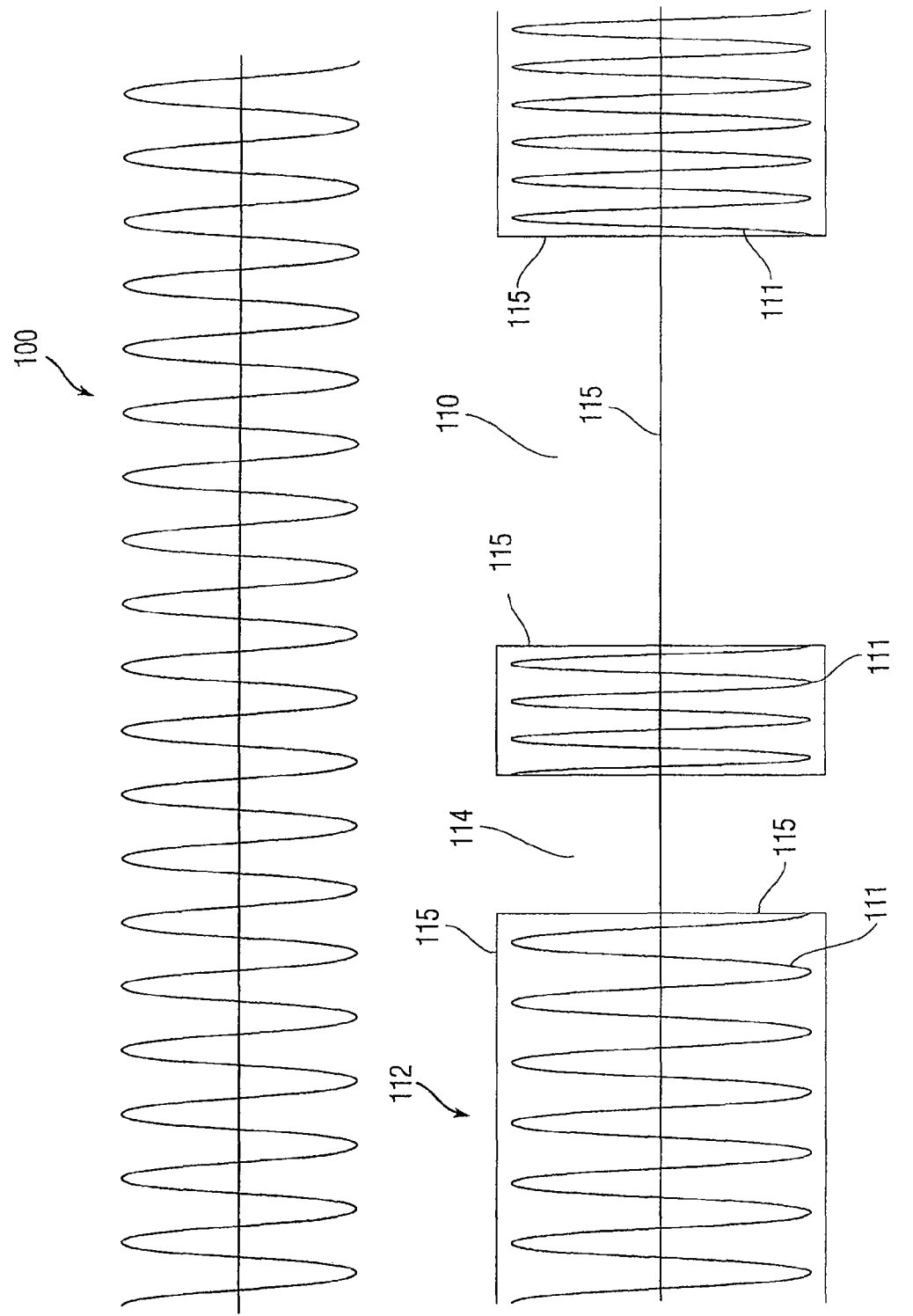

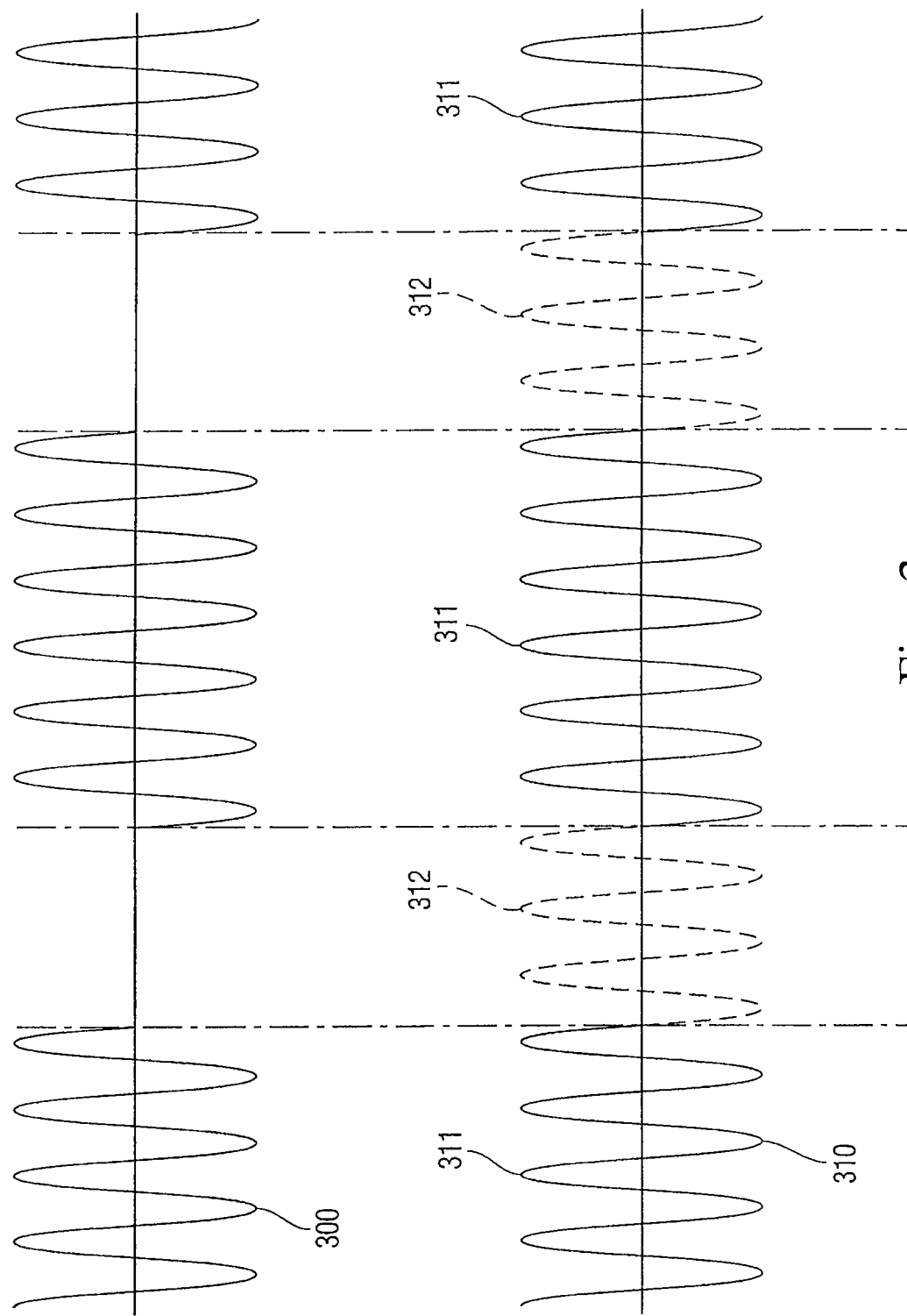

OUT OF BAND DATA TRANSFER OVER OPTICAL CONNECTIONS

FIELD OF THE INVENTION

This relates generally to high speed networking and more specifically to transferring out of band (OOB) data over optical connections.

BACKGROUND OF THE INVENTION

Serial Attached SCSI (SAS) and Serial Advanced Technology Attachment (SATA) are two known communication standards for computer buses and/or networks. Connections according to these standards are often used to attach hard disk drives to host computers, but may feature other uses as well.

SAS and SATA feature signal communications in relatively high frequencies during normal operation. Also, SATA and SAS may feature data rates of 1.5 Gbps to 6 Gbps. The signals used by SAS and SATA during ordinary operations are referred to as in-band frequency signals. However, in some relatively rare occasions, SAS and SATA devices communicate using signals that are different than those used in ordinary communications. These signals are usually used during link initializations, and referred to as out of band (OOB) signals.

The existing SAS and SATA standards allow for communications only over relatively short distances due to the electrical properties of the physical communication systems required by those standards.

SUMMARY OF THE INVENTION

Embodiments of the invention provide various schemes for transmitting out of band signals over optical connections that may not support the transmission of such signals. For example, one scheme can involve converting the out of band signals to different types of signals that are supported by the optical connection, while another may utilize a separate parallel connection that supports transmission of out of band signals in order to extend the connection.

In accordance with one embodiment of the invention, a communication device comprises a controller configured to communicate according to a communication protocol, the communication protocol providing for in-band and out-of-band signals; and a converter circuit coupled to the controller, the converter circuit configured to convert an outgoing out-of-band signal generated by the controller to an in-band signal that encodes information carried by the out-of-band signal, process an incoming in-band signal that is generated from a converted remote out-of-band signal to decode data in the incoming in-band-signal, and generate a resulting out-of-band signal based on the data in the incoming in-band signal, the resulting out-of-band signal being functionally equivalent to the remote out-of-band signal.

In another embodiment, a system comprises a first device; and a second device coupled to the first device over a connection, the first and second devices each comprising: a controller configured to communicate according to a communication protocol, the communication protocol providing for in-band and out-of-band signals; and a converter circuit coupled to the controller, the converter circuit configured to convert an outgoing out-of-band signal generated by the controller to an in-band signal that encodes information carried by the out-of-band signal, process an incoming in-band signal that is generated from a converted remote out-of-band signal to decode data in the incoming in-band-signal, and generate a resulting out-of-band signal based on the data in the incoming in-band signal, the resulting out-of-band signal being functionally equivalent to the remote out-of-band signal.

One embodiment of the invention provides a device for communication, which comprises a controller connected to a first connection and configured to communicate through the first connection according to a first communication protocol, the first communication protocol providing for in-band and out-of-band signals, the controller further configured to generate in-band and out-of-band signals, and send the in-band signals over the first connection; an out-of-band (OOB) interface connected to a second connection and configured to communicate through the second connection according to a second communications protocol different than the first protocol, the OOB interface further configured to receive the out-of-band signals from the controller, and send the out-of-band signals over the second connection.

Another embodiment of the invention is a method for communication according to a first protocol, the first protocol providing for in-band and out-of-band signals, the method comprising: generating in-band and out-of-band signals according to the first protocol by a device; sending the generated in-band signals by the device to a first connection; converting each out-of-band signal to a resulting in-band signal that encodes information carried by the out-of-band signal; and sending the resulting in-band signals to the first connection.

Yet another embodiment of the invention provides a method for communication according to a first protocol, the first protocol providing for in-band and out-of-band signals, the method comprising: generating in-band and out-of-band signals according to the first protocol by a device; sending the generated in-band signals by the device to a first connection according to the first protocol; and sending the out-of-band signals to a second connection according to a second protocol, wherein the first connection is configured to reliably transmit in-band signals, while the second connection is configured to reliably transmit out-of-band signals.

According to one embodiment of the invention, a communication device comprises a controller configured to communicate according to a communication protocol, the communication protocol providing for in-band and out-of-band signals; and a modulation circuit coupled to the controller, the modulation circuit configured to modulate a reference clock for an outgoing out-of-band signal generated by the controller so that a resulting in-band signal encodes information carried by the out-of-band signal, wherein the resulting in-band signal is transmitted to an optical transceiver external to the controller.

Another embodiment of the invention provides a system comprising a first device; and a second device coupled to the first device over a connection, the first and second devices each comprising: a controller configured to communicate according to a communication protocol, the communication protocol providing for in-band and out-of-band signals; and a modulation circuit coupled to the controller, the modulation circuit configured to modulate a reference clock for an outgoing out-of-band signal generated by the controller so that a resulting in-band signal encodes information carried by the out-of-band signal, wherein the resulting in-band signal is transmitted to an optical transceiver external to the controller; a Phase-Locked-Loop (PLL) circuit for receiving an incoming modulated signal; and a demodulation interface coupled to an out-of-band signal encoder for processing the incoming modulate signal and generating a resulting out-of-band signal based on the in-coming in-band signal.

In another embodiment of the invention, provided is a method for communication according to a first protocol, the first protocol providing for in-band and out-of-band signals, the method comprising: generating in-band and out-of-band signals according to the first protocol by a device; and sending the generated in-band signals by the device to a first connection; modulating a reference clock for the generated out-of-band signals so that resulting signals encodes information carried by the out-of-band signals; and sending the resulting signals to the first connection.

BRIEF DESCRIPTION OF THE DRAWINGS

FIG. 1 is a diagram showing exemplary in-band and out of band signals according to embodiments of the present invention;

FIG. 3 is a diagram of an exemplary original OOB signal and an exemplary modified signal having different types or flavors intended to carry the information in the original OOB signal according to embodiments of the present invention;

DETAILED DESCRIPTION OF THE PREFERRED EMBODIMENTS

Figure 2A:
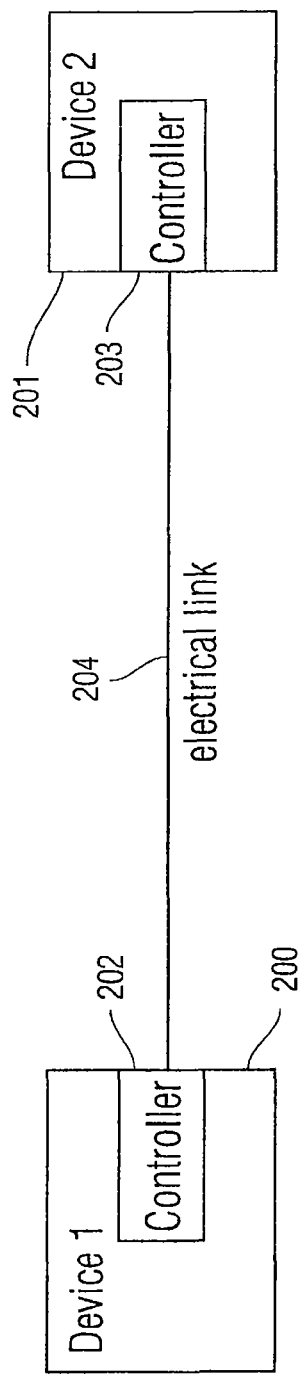
FIG. 2A is a diagram showing two exemplary devices communicating through a standard SAS or SATA link according to embodiments of the present invention.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to transmitting out of band signals over optical connections that may not support the transmission of such signals. Various schemes of transmitting the out of band signals can be used, such as converting the out of band signals to different types of signals that are supported by the optical connection, using a separate parallel connection that supports the transmission of out of band signals, or modulating a reference clock of the transmitter during the OOB periods.

Although embodiments of the invention may be described and illustrated herein in terms of SAS and SATA communications, it should be understood that embodiments of this invention are not so limited, but may apply to any standards that require transmission of out of band signals over existing optical links.

FIG. 1 is a diagram of an exemplary in-band signal 100 and an exemplary out of band signal 110. These signals can be generated in accordance with the SAS or SATA standards, or other similar standards. In the SAS or SATA standards, signals 100 and 110 represent differential voltages in a differential pair of connectors that are usually used to transmit signals according to these standards. It should be understood that FIG. 1 is for illustration only and is not drawn to scale.

In-band signal 100 may be a signal of relatively constant amplitude and with frequency/phase that varies in a narrow range around a predefined carrier frequency derived from the reference clock of the transmitter. The information the signal is intended to transmit may be encoded in the frequency variations. More specifically, the information may be encoded into a plurality of characters that are encoded in predefined frequency/phase variations of the signal 100. Thus, the in-band signal 100 may be generally referred to as a baseband signal.

Out of band signal 110 is shown below the in-band signal 100 in FIG. 1. Lines 111 define and demonstrate the on-off nature of the actual out of band signal 110. As can be seen in FIG. 1, the out of band signal can be similar to the in-band signal but it may be inactive (or set to '0') during certain periods of time and active during other periods. For example, the signal is active during periods 112 and inactive during periods 114. This on-off behavior and associated timing carry the out-of-band information. No oscillator frequency or phase variations are needed to exist in the active phase of the out-of-band signal. Instead, transmitted information is encoded by the occurrence and length of respective periods of activity and/or inactivity. The active portions of the signal 110 can still encode various characters in frequency or phase modulations. However, these characters can be considered to be irrelevant by the standard, and are usually not decoded by the receiving device for out-of-band communications. Instead, receiving devices detect envelope information, or the maximums and/or minimums of the signal over short periods of time. The envelope information of signal 110 is represented by lines 115. The envelope information clearly indicates when the various active and inactive portions begin or end. Since the informational portions of the out-of-band signal depend on the amplitude of variations of the signal, the out-of-band signal can be referred to as an amplitude modulated signal. Conversely, the in-band signal is in general a constant amplitude baseband signal based on a reference clock.

The out of band signal may be used in the initial stages of communication to allow devices to negotiate various communication parameters, such as the oscillator frequency/data rate or equalization. An advantage of the out of band signal is that the devices need not to tune their circuits to a specific frequency to detect the envelope information.

In some embodiments, the out of band signal can be active throughout all time periods. Instead of having active and inactive periods, the out of band signal can include periods of different amplitudes. Thus, periods 112 may correspond to periods in which the signal has a first amplitude, and periods 114 may correspond to periods in which the signal has a second amplitude.

FIG. 2A is a diagram showing an exemplary conventional data link between at least two devices. This may be a SAS or SATA data link, or another similar type of data link. Devices 200 and 201 can include controllers 202 and 203, respectively. Again, these may be SAS or SATA controllers or other types of controllers if another type of network is used. The controllers can be connected through a conventional wire link 204. Link 204 may be a differential pair as specified in the SAS and SATA standards. Each controller may be used to receive a stream of data provided by its respective device, encode the data into a baseband signal in accordance with the SAS or SATA standards and send the signal over link 204. Furthermore, each controller can also receive a SAS or SATA signal from link 204, decode the signal to obtain a stream of data and send the data to a respective device. In addition, each controller can be configured to perform preliminary communications with the other controller over link 204 in order to establish a connection between the two controllers and/or to negotiate the parameters of the connection. These preliminary communications can be at least partially performed with the use of out-of-band signals, such as signal 110 of FIG. 1. Thus, the two devices can communicate with each other by using their respective controllers and connection 204. The controllers may be implemented on one or more application specific integrated circuits (ASICs).

As noted above, the conventional network configuration may be limited in terms of the length of the connection 204. In the SAS and SATA standards, a maximum length of only 12 m is specified. For longer connections, the electrical properties of the signal can be degraded due to attenuation in the connection 204. The limited connection length limits the use of SAS and SATA networks.

Figure 2B:
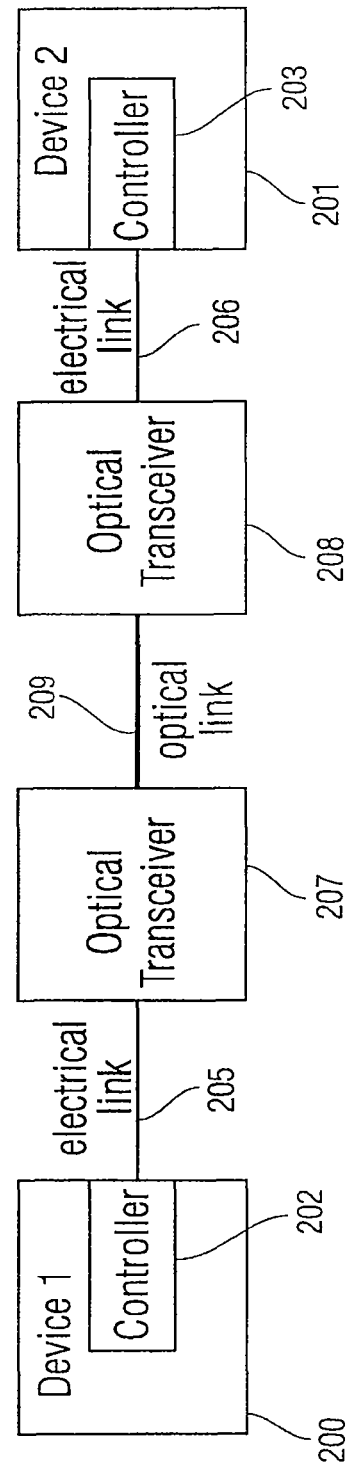
FIG. 2B is a diagram showing two exemplary devices communicating through a SAS or SATA link that is extended by an optical link according to embodiments of the present invention.

Embodiments of the present invention utilize an optical connection in order to extend the maximum connection length of a SAS, SATA or a similar network. FIG. 2B shows an exemplary network configuration that uses an optical connection to extend the communication range according to embodiments of the invention.

Device 200 is connected to an optical transceiver 207 through its controller 202 and electrical cable 205. Similarly, device 201 is connected to an optical transceiver 208 through its controller 203 and electrical cable 206. Cables 205 and 206 can be similar to cable 204 and can include a differential pair of wires or conductors on a printed circuit board. The two optical transceivers can be connected through an optical link 209, such as an optical cable.

The optical transceivers can be designed to convert received electrical signals into resulting optical signals and convert received optical signals into the original electrical signals. Thus, electrical signals sent by device 200 to optical transceiver 207 can be converted into optical signals by transceiver 207, sent to transceiver 208, converted back into electrical signals by transceiver 208 and sent to device 201. Signals can be sent from device 201 back to device 200 in a similar manner. Thus, the two devices can communicate as if they were directly connected (as shown in FIG. 2A). The optical signals can be configured according to known standards that allow for greater length of cable, such as T11 (Fibre Channel). Thus, the use of an optical link can increase the range of communication in existing SAS and SATA networks or other similar networks.

To reduce costs and keep transmission speeds high, relatively unsophisticated optical transceivers can be used. These transceivers can rely entirely on analog signal processing without actually decoding any of the received signals or otherwise relying on the data these signals hold. However, many existing transceivers of such types may not correctly transmit the out of band signal over the optical link. More specifically, these transceivers can fail to transmit signals of varying amplitude. Incorrect transmission of the OOB signals can prevent initialization of the connection and generally prevent devices 200 and 201 from performing any useful communication.

Embodiments of the present invention address the above problem in one of three general ways: (i) they can replace the OOB signal with another signal that carries the same information but can be transmitted over an optical link, (ii) they use another connection to carry an OOB signal, or (iii) they modify the reference clock of data signals in such a manner as to carry the OOB information.

The first option is illustrated in FIG. 3, which shows two signal graphs 300 and 310. The signal graph 300 shows an exemplary OOB signal, while the signal graph 310 shows an exemplary modified signal that is intended to carry the same information as the OOB signal of graph 300.

The OOB signal of graph 300 includes active and inactive portions, which represent the on and off periods of the OOB signal. Such OOB information is generally encoded in special characters (pattern) or different frequencies. The signal of graph 310 does not include any inactive portions. Instead, the signal graph 310 includes two different types or flavors of signals. The first flavor is referenced by numeral 311 and drawn in solid lines and the second one is referenced with numeral 312 and drawn in broken lines. The first flavor is associated with the active portions of original OOB signal 300 and the second associated with the inactive portions of the OOB signal 300. Thus, the modified signal 310 can be obtained from the original OOB signal 300 by replacing all active portions of the OOB signal 300 with a signal of the first flavor and all inactive portions of the OOB signal 300 with a signal of the second flavor.

There are a few known ways to predefine the first and second flavors such that they are distinguishable from each other. For example, the first and second flavors can be waveforms encoding two different sequences of characters. More specifically, the first flavor can encode a sequence of "1" and the second flavor a sequence of "0". It should be noted that "1" and "0" in this case are characters that are encoded by a waveform signal and not voltage values of the signal itself, and thus a signal encoding a sequence of "0" does not need to have a voltage value of 0.

In other embodiments, the two flavors may indicate different wavelengths or frequencies of two different signals. In yet other embodiments, the different flavors may indicate different phases of the two different signals. In some embodiments, the two waveforms may be similar or identical except for the above-mentioned difference in frequency and/or phase. In some embodiments the two waveforms may encode different characters using frequency or phase modulation.

The use of solid and broken lines for the two flavors 311 and 312 are for the sole purpose of illustrating that some difference exists between those two types of signals. It should be noted that the two types of signals 311 and 312 need not be exactly as pictured in FIG. 3 but can feature any predefined difference between them, such as different frequencies, phases and/or encoded characters as discussed above.

The two types or flavors of signals 311 and 312 are configured to be transmittable over an optical connection. In other words, the optical transceivers 207 and 208 of FIG. 2B can reliably transmit and receive these signals. This can be achieved by ensuring that flavors 311 and 312 have a frequency and amplitude that place these signals within the operational range of the optical transceivers. For example, a range of 300 MHz to 20 GHz, 100 mv to 800 mv p-p differential can be used. As a result of such configuration, the modified signal 310 can not only include the information stored in the original OOB signal 300 (i.e., the lengths of the various active and inactive portions) but also be easily transmittable over an optical link.

Embodiments of the invention enable the replacement of the original OOB signals 300 by the modified signal 310 in a number of different ways. For instance, according to some embodiments, existing controllers of the communication devices may be modified with additional elements or functionality for generation and use of the modified signal 310 whenever the standards call for an OOB signal. In alternative embodiments, converters or converting elements may be added to existing legacy SAS and SATA components only compatible with OOB signals to provide conversion between OOB signals and modified signals in either direction of signal transmission. Examples of these two options are shown in FIGS. 4A and 4B.

Figure 4A:
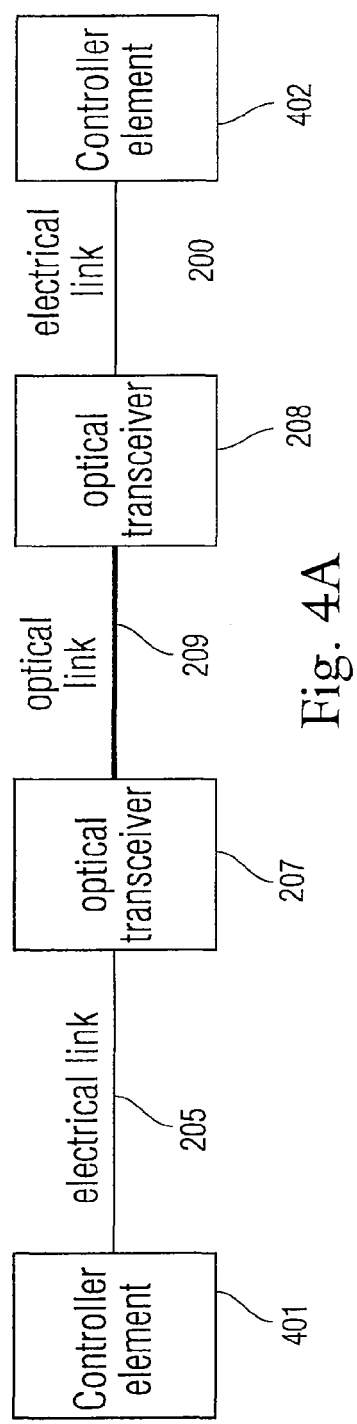
FIG. 4A is a diagram of an exemplary network featuring controller elements with embedded OOB signal replacement functionality according to embodiments of the invention.

FIG. 4A shows an exemplary embodiment in which the above-discussed modified functionality is embedded in a new element in a communication controller. For instance, controller elements 401 and 402 in FIG. 4A can be elements within controllers 202 and 203 of devices 200 and 201 (see FIG. 2). These elements are configured to communicate according to SAS, SATA or any other related standard, except that they process the modified signal instead of an OOB signal. Elements 401 and 402 can be, for example, integrated circuits (IC's) within controllers 202, 206, or individual smaller circuits within larger IC's that are part of these controllers.

Figure 4B:
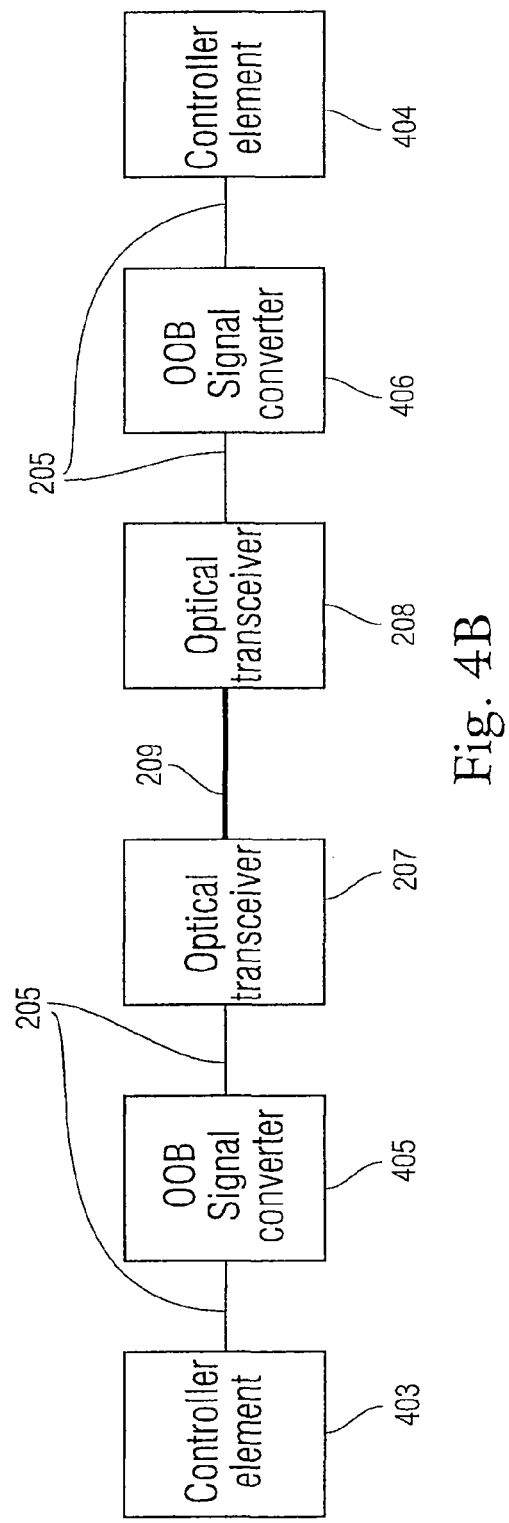
FIG. 4B is a diagram of an exemplary network featuring controller elements and added OOB signal converters according to embodiments of the invention.

FIG. 4B shows an exemplary embodiment in which a conventional controller element is used. As shown in FIG. 4B, controller elements 403 and 404 that are conventional elements processing OOB signals are connected to OOB signal converters 405 and 406 that convert the OOB signals into modified signals, such as signal 310 of FIG. 3. The converted signals are then sent to the optical transceiver 207 and 208. The signal converters can also receive modified signals from the optical transceivers and convert them back into OOB signals. With regard to any signals other than OOB signals or modified signals intended to replace OOB signals, the signal converters do not perform the conversion. Thus, during ordinary communications (e.g., after the connection has been initialized), all other types of signals would pass through the OOB signal converters without going through the conversion.

Figure 5:
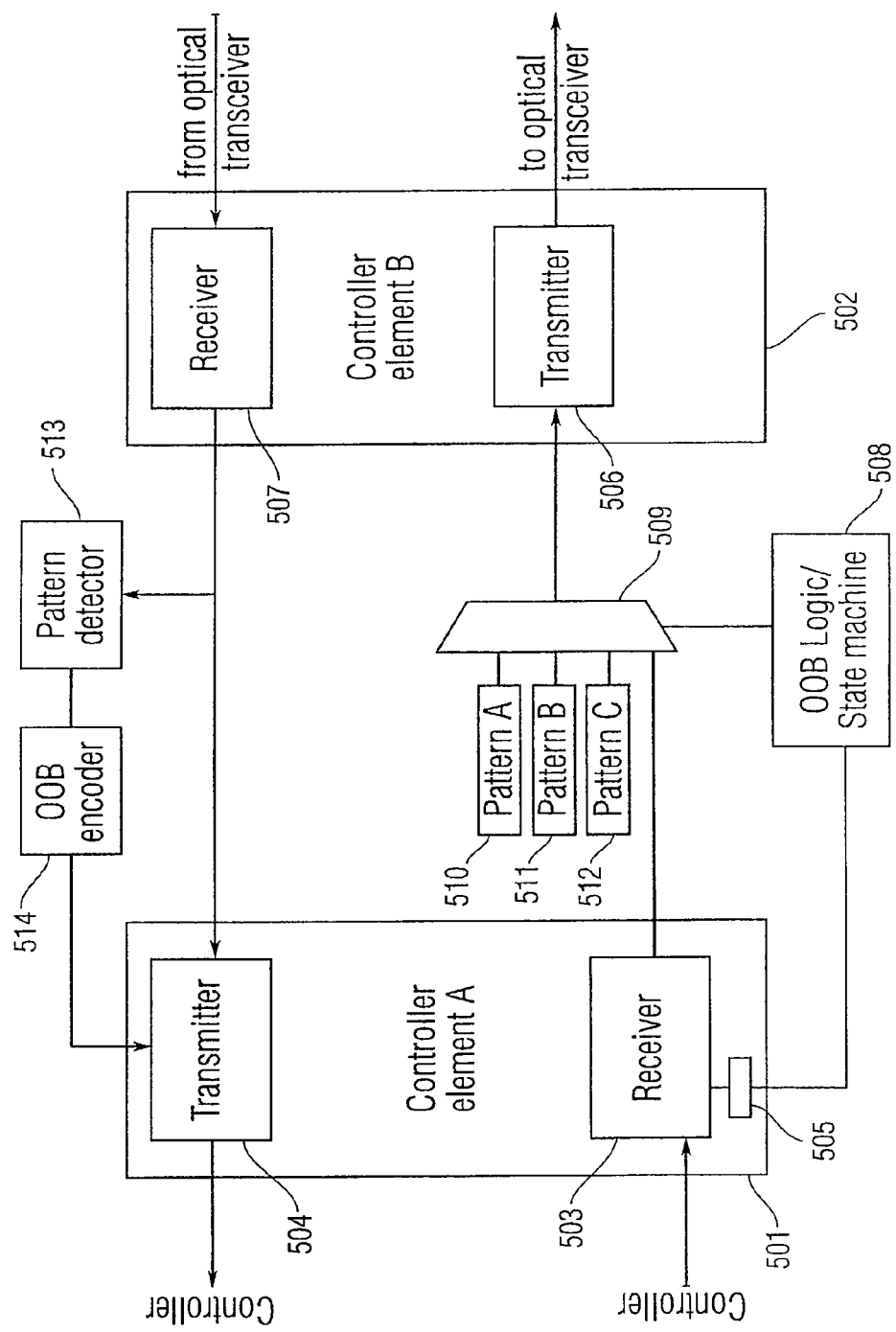
FIG. 5 is a diagram showing a portion of an exemplary controller according to embodiments of the present invention.

FIG. 5 shows a portion of an exemplary SAS/SATA controller. Control elements 501 and 502 can be two conventional controller elements that process outgoing and incoming SAS/SATA signals. Element 501 can encode the signals, while element 502 can perform final electrical conditioning of the signals in order to send them to a transmission line. Both elements 501 and 502 can perform conventional signal processing. Elements 505, 508-512 of FIG. 5 are used to convert any OOB signals produced by conventional element 501 into modified signals suitable for optical transmission (such as modified signal 310 in FIG. 3). Elements 513 and 514 convert incoming modified signals into conventional OOB signals.

In the control element 501, receiver 503 receives a signal from the controller. The received signal may be a SAS and SATA signal that is not yet encoded for external transmission (i.e., transmission on network cables). The receiver 503 encodes that signal into a SAS/SATA signal ready for external transmission. The signal received and encoded by receiver 503 may include an OOB signal.

A copy of the OOB signal output from the receiver 503 is further received at a rectifier-filter or an envelope detector 505, which can convert the OOB signal into a signal that only tracks the envelope of the original OOB signal. For instance, the signal output by element 505 can be similar to the lines 115 of FIG. 1. Specifically, element 505 can receive an OOB signal that includes periods of fluctuation (e.g., activity and inactivity) and produce a simple square wave indicating the active and inactive periods of the received OOB signal.

The square wave can be sent to an OOB logic/state machine 508, which uses the square wave to control multiplexer (MUX) 509. MUX 509 can select one of multiple inputs and output the selected input. The OOB logic/state machine 508 can detect if there is OOB signal being transmitted by control element 501 based on the inactive periods of the square wave received from element 505. If the received square wave contains no inactive periods, no OOB signal is being transmitted. In other words, a regular in band signal is being transmitted. In that case, the OOB logic/state machine 508 will control MUX 509 to output the signal produced by receiver 503.

If an OOB signal is being transmitted, the OOB logic/state machine 508 can command the MUX 509 to output one of the signals received from pattern generators A and B (510 and 511). Pattern generators 510 and 511 are modules that generate predefined data signals. The generated signal can be a simple wave of a predefined frequency or a more complex signal. Pattern generators may generate the signals continuously while the overall system is in operation. The signals generated by the pattern generators can have specific frequencies or phases, or follow different patterns of signals of varying frequencies and/or phases. As an example, the patterns generated by pattern generators 510 and 511 can correspond to the two flavors of modified signal 310 of FIG. 3 (i.e., flavors 311 and 312) that are intended to respectively indicate an active or an inactive portion of the OOB signal. The signal produced by pattern generator 510 can indicate an active portion of the OOB signal and the signal produced by pattern generator 511 can indicate an inactive portion. In other embodiments, the generated patterns can correspond to varying amplitude portions of the OOB signal.

The OOB logic/state machine 508 can control the MUX 509 to output the pattern received from pattern generator 510 during active periods of the OOB signal (i.e., when the square wave received from element 505 is asserted) and output the pattern received from pattern generator 511 during inactive periods of the OOB signal (i.e., when the square wave received from element 505 is de-asserted). As a result, the MUX 509 can output a signal similar to (or the same as) modified signal 310.

One or more optional programmable pattern generators such as generator 512 can also be connected to the MUX 509. The programmable pattern generators can allow the generated pattern(s) to be reconfigured in order to improve interoperability of the device. In some embodiments, pattern generators 510 and 511 are programmable and no other pattern generators need to be used.

As discussed above, MUX 509 outputs a modified signal (such as signal 310 of FIG. 3) that encodes the data contained in an OOB signal and good for optical transmission. Transmitter 506 of control element 502 conditions the modified signal for transmission over an external network and sends it to an optical transceiver (e.g., transceiver 207 of FIGS. 4A and 4B). Since this signal is a modified signal that can be used for optical transmission, the optical transceiver will correctly convert the received signal into an optical signal, which can be transmitted over an optical connection (e.g., connection 209) and correctly converted back into the same electrical signal by another optical transceiver (e.g., transceiver 208).

Referring back to FIG. 5, how a modified signal such as signal 310 is processed will be described. The incoming signal from an optional transceiver is received by receiver 507 in the control element 507. Receiver 507 processes the signal in a manner that maintains the logical content and provides useable copies to both a pattern detector 513 and a transmitter 504 in the control element 501. The pattern detector 513 receives the modified signal and further detects the patterns 311 and 312 (see FIG. 3) of the modified signal that correspond to respective active and inactive portions of the original OOB signal. The pattern detector can be a digital match filter or another type of filter/detector. The pattern detector can be configured to recognize the two patterns being currently used to encode the two states of the OOB signal (e.g., the patterns produced by pattern generators 510 and 511).

The pattern detector 513 can output a signal that indicates the periods of activity/inactivity of the original OOB signal. In some embodiments, the pattern detector can output a square wave similar to the square wave output by element 505 (e.g., one that is asserted when the original OOB signal is active and de-asserted when it is inactive). Thus, the pattern detector can output a signal indicating the envelope of an OOB signal. An OOB encoder 514 can receive the signal output by the pattern detector and convert it to an actual OOB signal. This conversion can be done by replacing the high periods of the square wave with a sinusoidal wave to obtain an OOB signal (such as signal 110). Once generated by the OOB encoder, the OOB signal can be sent to transmitter 504.

Transmitter 504 can forward the OOB signal to other modules of the controller. If an ordinary in-band signal (i.e., a signal other than a modified OOB signal) is being received by receiver 507 from the optical transceiver, the transmitter 504 can input the in-band signal directly from receiver 507. The transmitter 504 can then process the in-band signal and send a logically unaltered signal to other modules of the controller. The pattern detector 513 and OOB encoder 514 can dictate a benign indication to the transmitter 504 such that this transmitter passes the signal logically unaltered. The pattern detector is able to recognize the programmable special pattern to discriminate between normal traffic and a modified OOB signal sequence.

During ordinary communication (e.g., after the initialization period), when only in-band signals are used, the MUX 509 can forward a signal directly received from the receiver 503 so as to enable the entire system to operate in a conventional manner.

Figure 6:
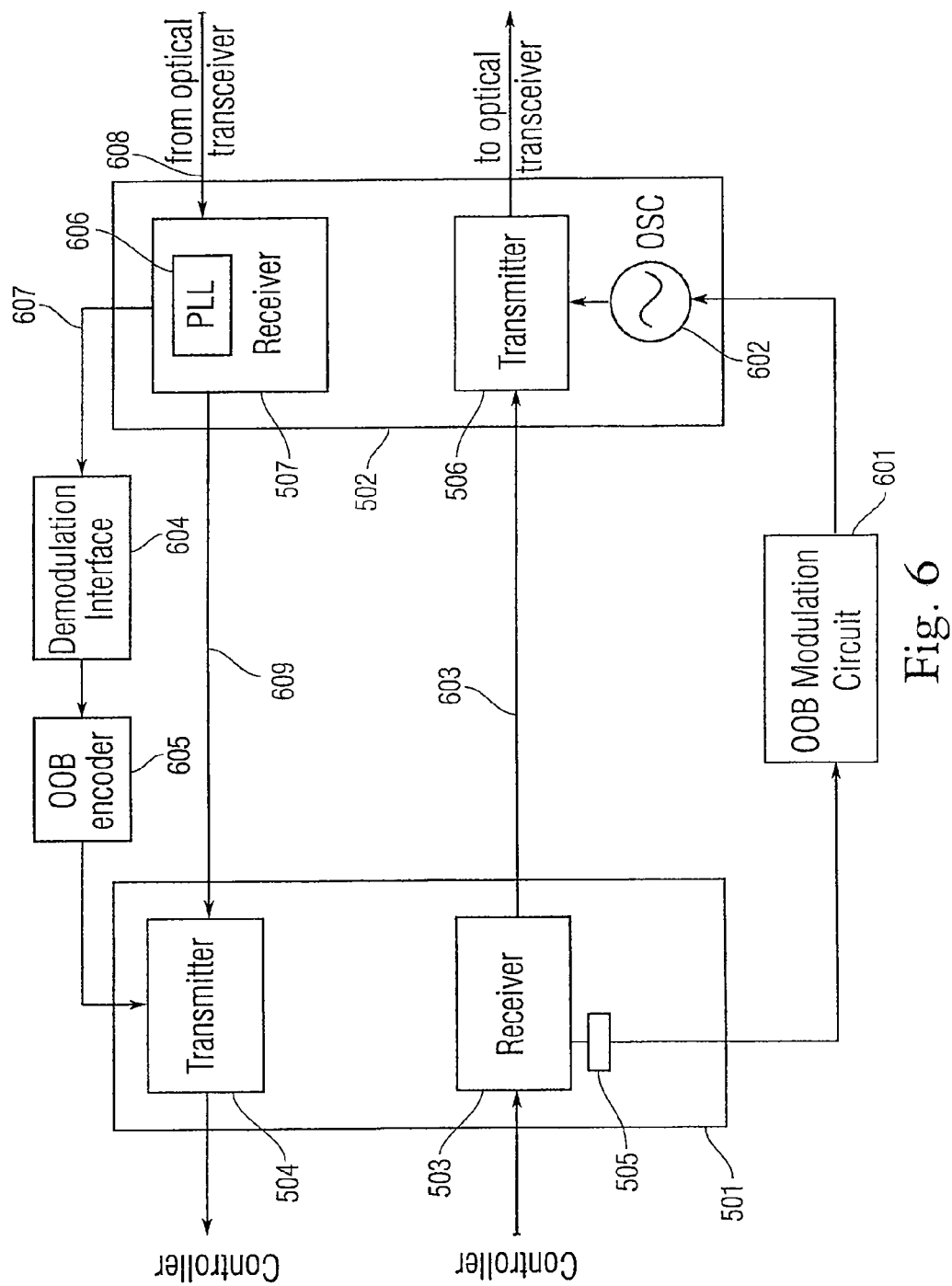
FIG. 6 is a diagram showing a portion of an alternative exemplary controller according to embodiments of the present invention.

FIG. 6 is another embodiment of the invention in which the OOB signal is encoded in a different manner. As in FIG. 5, element 505 can tap a received OOB signal and produce a square wave, which will be received and conditioned by an OOB modulation circuit 601. For example, the OOB modulation circuit may shift the square wave in the x (amplitude) axis and/or compress it in the amplitude axis in order to produce a square wave (or filtered square wave) whose values are two predefined non zero levels, such as 1V and 0.8V. The output of the OOB modulation circuit is fed into a voltage-controlled oscillator 602. The voltage controlled oscillator 602 can serve as a data clock of the data transmitter 506.

The voltage of the signal produced by the OOB modulation circuit 601 can be used to control the frequency of the signal produced by data clock 602. Thus, the OOB modulation circuit 601 can effectively frequency modulate the output of oscillator 602 based on whether an active or inactive portion of the OOB signal is currently being sensed by element 505 and the OOB modulation circuit 601.

The transmitter 506 can be configured to transmit a signal produced by data clock 602 during the transmission of the OOB signal. As a result, the output of transmitter 506 is a signal that does not include any active or inactive portions as the original OOB signal but is instead an in band signal that features periods of varying frequencies that correspond to the active and inactive periods of the original OOB signal. Thus, the system of FIG. 6 can convert the OOB signal into a frequency modulated in-band signal that carries the same information as the original OOB signal.

Various types of frequency and phase modulation can be used. For example, frequency shift keying, minimum shift keying, phase shift keying and binary phase shift keying can be used. Different modulation schemes can be associated with different types of OOB modulation circuits that are configured to provide the necessary control signals for the different schemes of modulation to oscillator 602.

During transmission of an ordinary in-band signal (e.g., after initialization is complete), the signal is transmitted from the receiver 503 to transmitter 506 with the modulated signal going into the data clock or reference clock 602 being inactive. In other words, there is no modulation of the oscillator 602 during in-band communications.

The system of FIG. 6 can receive an in-band frequency or phase modulated signal that is intended to encode an OOB signal, such as signal 608 that is received from an optical transceiver. The device of FIG. 6 can decode the frequency modulated signal 608 in order to reproduce the original OOB signal.

In one embodiment, this can be achieved by using a phase-locked-loop (PLL) circuit 606 in receiver 507. The PLL circuit 606 can receive the modulated signal and compare it to a reference oscillating signal that is set to a carrier frequency of the incoming modulated signal. The PLL circuit 606 can then output an error signal that corresponds to a difference (if present) between the received modulated signal 608 and the reference signal. The error signal can thus indicate frequency and/or phase differences between the modulated signal and the reference signal. The error signal can indicate the state of the OOB signal. For example, an error signal of 0.2 V may indicate that the OOB signal is active, while an error signal of 0 V can indicate that the OOB signal is inactive. The relationship between the error signal and the OOB signal depends on the manner of encoding of the OOB signal by the OOB modulation circuit 601.

The error signal is received by a demodulator interface 604, coupled with OOB encoder 605, to reproduce the original OOB signal for transmitter 504. Transmitter 504 can forward the OOB signal to the rest of the controller. During ordinary communication (i.e., when no OOB signals are being used), the receiver 507 can transmit a received signal directly to transmitter 504 through connection 609.

The embodiment of FIG. 6, by modulating the signal based on a data or reference clock, encodes the OOB signal into a modulated in-band signal that is transportable over an optical interface. On the other hand, this embodiment can decode modulated in band signal received from an optical interface in order to extract the original OOB signal.

Figure 7:
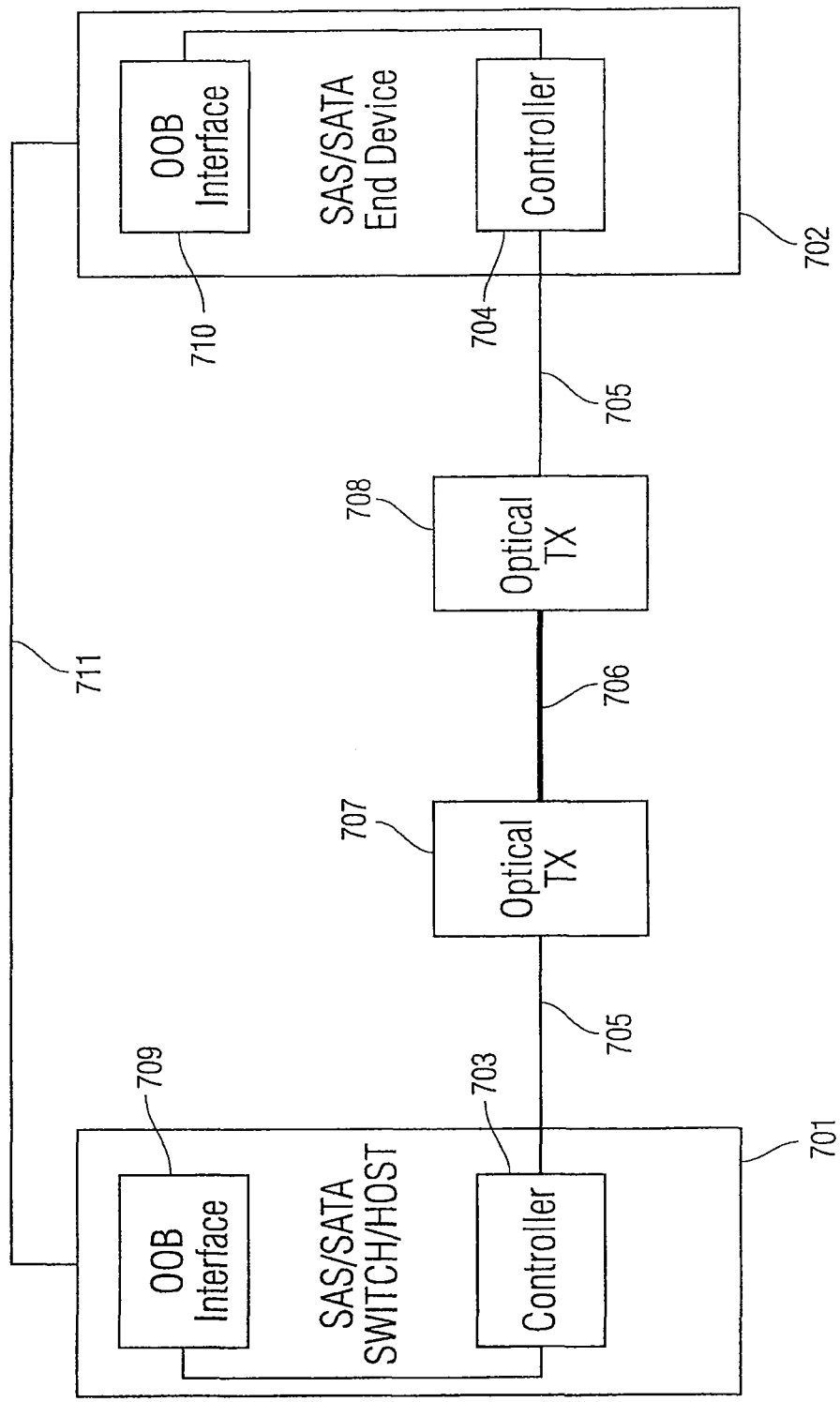
FIG. 7 is a diagram of an exemplary network featuring a dedicated OOB connection according to embodiments of the invention.

Alternative methods may be used to transmit OOB signals. For example, with reference to FIG. 7, embodiments of the invention may use a separate connection to transmit OOB signals. FIG. 7 shows a SAS or SATA switch or host 701 connected to a SAS or SATA end device 702 through a SAS or SATA connection. The connection may be realized through a controller 703 at the switch/host 701 and another controller 704 at the end device 702. The controllers can be connected to respective optical transceivers 707 and 708 through electrical connections 705. The optical transceivers can be connected to each other through an optical connection 706. As discussed above, the use of an optical connection can allow for connection over longer distances than what is specified in the SAS/SATA standards. As discussed above, connections 705 and 706 can be dual differential connections as specified by the SAS/SATA standards.

Communication between controllers 703 and 704 over connections 705 may not take place in the conventional manner, i.e., by using conventional OOB signals. This may result in the OOB signals being lost or distorted when converted to optical signals and transmitted over optical connection 706. Therefore, an additional alternative path is used for transmission for OOB signals. The switch/host and the end device include OOB interfaces 709 and 710, respectively. These interfaces are connected by connection 711. The OOB interfaces can be connected according to the SAS/SATA standard or any other standard, such as Ethernet, Fibre Channel (FC), etc. Connection 711 may also include an optical connection with proper encoding. In other embodiments, no physical connection 711 exists and the OOB interfaces can communicate wirelessly instead.

The OOB interfaces 709 and 710 are also connected to their respective controllers 703 and 704. Each OOB interface may copy the OOB signals from the controllers and transmit them to the other OOB interface over connection 711. In doing so, each OOB interface may process and/or encode the OOB signal as necessary. For example, if an Ethernet or FC connection is used, the OOB signals may be digitized and sent as digital data. When each OOB interface receives an optionally-encoded OOB signal from the other, it may decode the OOB signal, if necessary, and send it to its controller 703 or 704. The controller can use the OOB signals received from its respective OOB interface to perform any OOB communication required by the SAS/SATA standard. Each controller can use OOB communications received from its OOB interface 709 or 710 instead of any communications received from the other controller through connections 705. This will allow the controllers to communicate through a connection that includes an optical segment 706.

Figure 8:
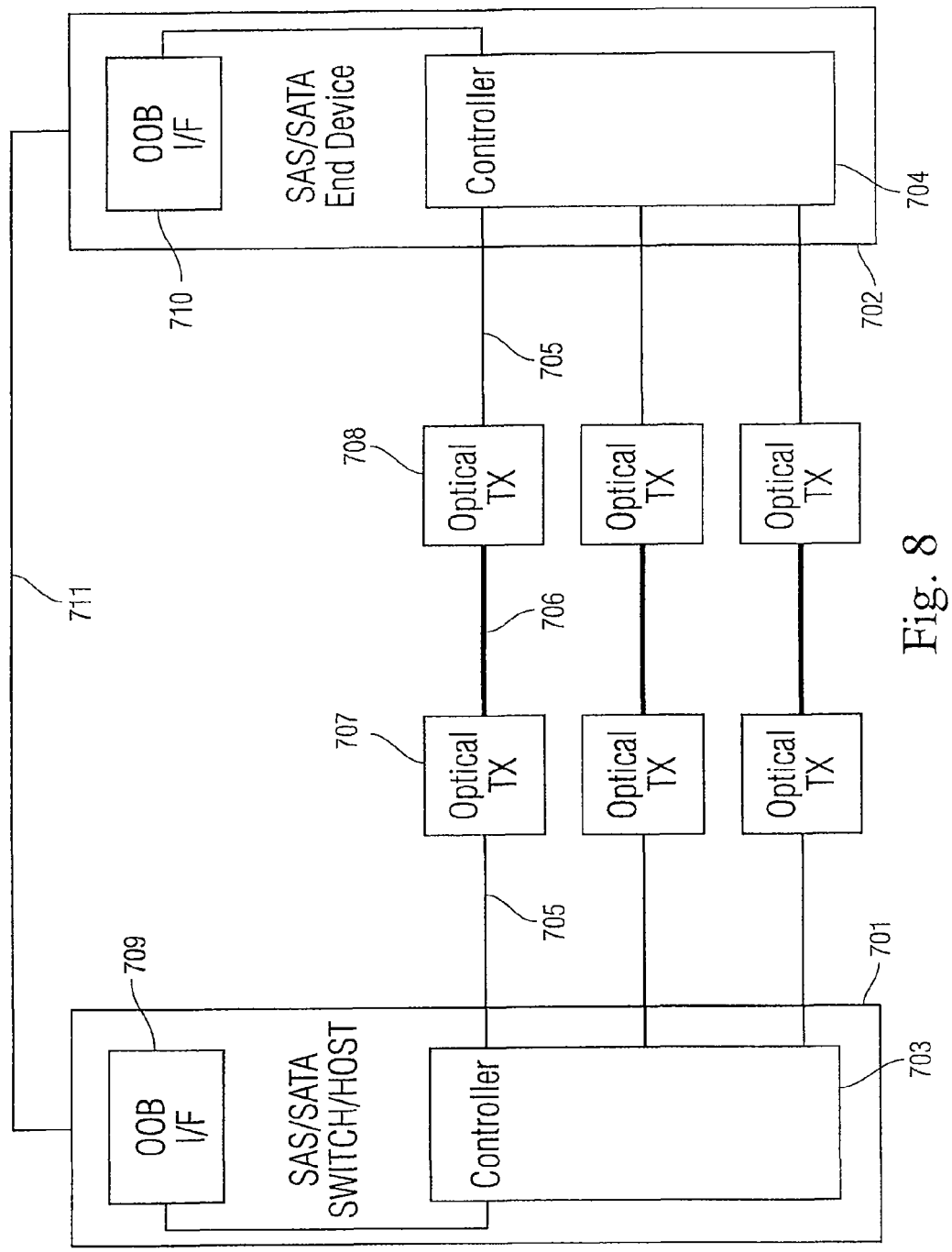
FIG. 8 is a diagram of an exemplary network featuring multiple primary connections and a dedicated OOB connection according to embodiments of the invention.

In some embodiments, there may be multiple parallel sets of connections between the controllers 704 and 703. For example, FIG. 8 shows a system including three parallel SAS/SATA connections between the two controllers. In some embodiments each device (i.e., the switch/host and the end device) can include two or more controllers and each of them can include one or more parallel SAS/SATA connections. In some embodiments, if multiple SAS/SATA connections are present, an additional parallel connection 711 is used to communicate OOB signals. When sending the OOB signals, the OOB interfaces can attach to the signals identifications indicating which connection each transmitted OOB signal is associated with. When receiving an OOB signal, each interface can analyze the identification and indicate to the controller which connection the received signal is associated with. If multiple controllers are used, each OOB interface can use the identification to determine which controller to send a received OOB signal to.

In other embodiments multiple connections may be used for the OOB signals as well. The multiple connections can be provided for fault tolerance and the like. In some embodiments, each SAS/SATA connection between the controllers can be associated with a separate parallel connection for transmitting OOB signals.

Embodiments of the invention may be used in various systems that utilize SAS and/or SATA communications or other types of communications that utilize OOB signals. Embodiments of the invention may be useful in settings that require relatively long SAS or SATA connections. For example, embodiments of the invention can be used in various storage systems, such as RAID arrays and the like. While the present specification refers to SAS and SATA, embodiments of the invention are not limited to these standards and may cover any other communication standards that require out of band communication.

In the examples discussed above, out-of-band communications are communications that are amplitude modulated in a system in which ordinary (or in-band) communications are constant amplitude baseband encoded data. However, out-of-band communications may not be so limited. In general, out-of-band communications can be communications that (i) are used for a particular system but are not the most common type of communications used for the system; (ii) are distinct from the most common type of communications used for that system in at least one characteristic; and (iii) this difference is significant enough as to provide at least some impediments of transmission of the out-of-band communications in at least some envisioned and desired configurations for the system.

For example, in-band communications can be communications according to a first carrier/clock frequency, while out-of-band communications can be communications according to a second carrier/clock frequency. Embodiments of the present invention can apply in any event of impediment for the transmission of the out-of-band communications.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A device for communication comprising:
 a controller configured to communicate according to a communication protocol, the communication protocol providing for in-band and out-of-band signals; and
 a converter circuit coupled to the controller, the converter circuit configured to
  convert an outgoing out-of-band signal generated by the controller to an in-band signal that encodes information carried by the out-of-band signal,
  process an incoming in-band signal that is generated from a converted remote out-of-band signal to decode data in the incoming in-band-signal, and
  generate a resulting out-of-band signal based on the data in the incoming in-band signal, the resulting out-of-band signal being similar to the remote out-of-band signal.

2. The device of claim 1, wherein the communication protocol is Serial Attached SCSI (SAS).

3. The device of claim 1, wherein the communication protocol is Serial Advanced Technology Attachment (SATA).

4. The device of claim 1, wherein the device is configured to send a first type of in-band signal and a second type of in-band signal, at least one of the first and second types of in-band signal resulting from a converted out-of-band signal.

5. The device of claim 4, further comprising a first connection, wherein the in-band signals of the first and second type are both sent over the first connection.

6. The device of claim 1, wherein the in-band signal is a constant amplitude baseband signal and the out-of-band signal is an amplitude modulated signal.

7. A system comprising:
 a first device; and
 a second device coupled to the first device over a connection,
 the first and second devices each comprising:
  a controller configured to communicate according to a communication protocol, the communication protocol providing for in-band and out-of-band signals; and
  a converter circuit coupled to the controller, the converter circuit configured to convert an outgoing out-of-band signal generated by the controller to an in-band signal that encodes information carried by the out-of-band signal, process an incoming in-band signal that is generated from a converted remote out-of-band signal to decode data in the incoming in-band-signal, and generate a resulting out-of-band signal based on the data in the incoming in-band signal, the resulting out-of-band signal being similar to the remote out-of-band signal.

8. The system of claim 7, wherein the connection includes:
two electrical portions;
an optical portion; and
two transceivers connecting the electrical portions with the optical portion respectively, each transceiver configured to convert between electrical signals and optical signals.

9. The system of claim 8, wherein the communication protocol is Serial Attached SCSI (SAS) or Serial Advanced Technology Attachment (SATA), and the optical portion is used to extend an achievable range of communication using the SAS or SATA physical standard.

10. A device for communication comprising:
a controller connected to a first connection and configured to communicate through the first connection according to a first communication protocol, the first communication protocol providing for in-band and out-of-band signals, the controller further configured to generate in-band and out-of-band signals, and send the in-band signals over the first connection; and
an out-of-band (OOB) interface connected to a second connection and configured to communicate through the second connection according to a second communications protocol different than the first protocol, the OOB interface further configured to:
receive the out-of-band signals from the controller, and
send the out-of-band signals over the second connection.

11. The device of claim 10, wherein the communication protocol is Serial Attached SCSI (SAS).

12. The device of claim 10, wherein the communication protocol is Serial Advanced Technology Attachment (SATA).

13. The device of claim 10, wherein the first connection is configured to reliably transmit the in-band signals, while the second connection is configured to reliably transmit the out-of-band signals.

14. The device of claim 10, wherein the OOB interface is further configured to convert the out-of-band signals to obtain converted signals that include information of the out-of-band signals and are formatted according to the second communication protocol.

15. The device of claim 14, wherein the second communication protocol is the Ethernet or Fibre Channel (FC) protocol.

16. The device of claim 10, wherein the controller is connected to multiple connections, the controller further configured to:
generate and send the in-band signals for each connection, and
generate the out-of-band signals corresponding to each connection and send the out-of-band signals to the OOB interface, wherein the OOB interface is further configured to
receive the out-of-band signals for the multiple connections, and
send the out-of-band signals for the multiple connections over the second connection.

17. The device of claim 10, wherein the in-band signal is a baseband signal and the out-of-band signal is an amplitude modulated signal.

18. A system comprising two devices according to claim 10, the first connection and the second connection, wherein the controllers of the two devices are connected through the first connection and the OOB interfaces of the two devices are connected through the second connection, the first connection comprising:
two electrical portions;
an optical portion; and
two transceivers connecting the electrical portions with the optical portion respectively, each transceiver configured to convert between electrical signals and optical signals.

19. A method for communication according to a first protocol, the first protocol providing for in-band and out-of-band signals, the method comprising:
generating in-band and out-of-band signals according to the first protocol by a device;
sending the generated in-band signals by the device to a first connection;
converting each out-of-band signal to a resulting in-band signal that encodes information carried by the out-of-band signal; and
sending the resulting in-band signals to the first connection.

20. The method of claim 19, further comprising:
receiving an incoming in-band signal from the first connection, the incoming in-band signal resulting from a converted remote out-of-band signal generated by another device, and
processing the incoming in-band-signal to generate a resulting out-of-band signal based on data encoded in the incoming in-band signal, the resulting out-of-band signal being functionally equivalent to the remote out-of-band signal.

21. The method of claim 19, wherein the first protocol is Serial Attached SCSI (SAS) or Serial Advanced Technology Attachment (SATA).

22. The method of claim 19, wherein the in-band signal is a baseband signal and the out-of-band signal is an amplitude modulated signal.

23. The method of claim 19, wherein the first connection cannot reliably transmit an out-of-band signal.

24. The method of claim 23, wherein
the first connection is a hybrid connection including an electrical and optical portion, wherein the optical portion is used to extend the first connection beyond a limited length for an electrical connection according to the physical standard associated with the first protocol, and not used to reliably transmit an out-of-band signal.

25. The method of claim 24, wherein the first protocol is SAS or SATA.

* * * * *